Figure 27:
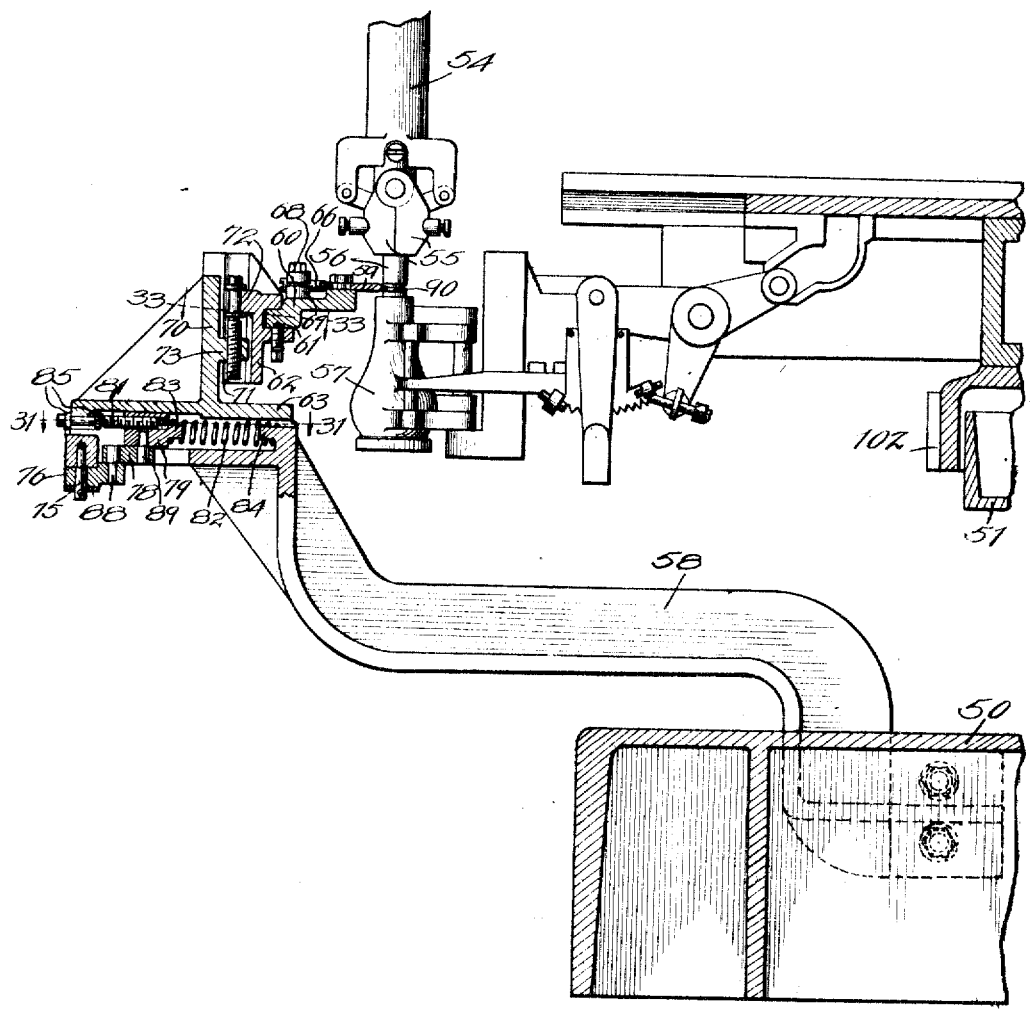

A. KADOW.
GLASS ARTICLE DISCHARGE AND CUT-OFF MECHANISM.
APPLICATION FILED OCT. 21, 1912.
1,208,978.
Patented Dec. 19, 1916.
16 SHEETS—SHEET 1.
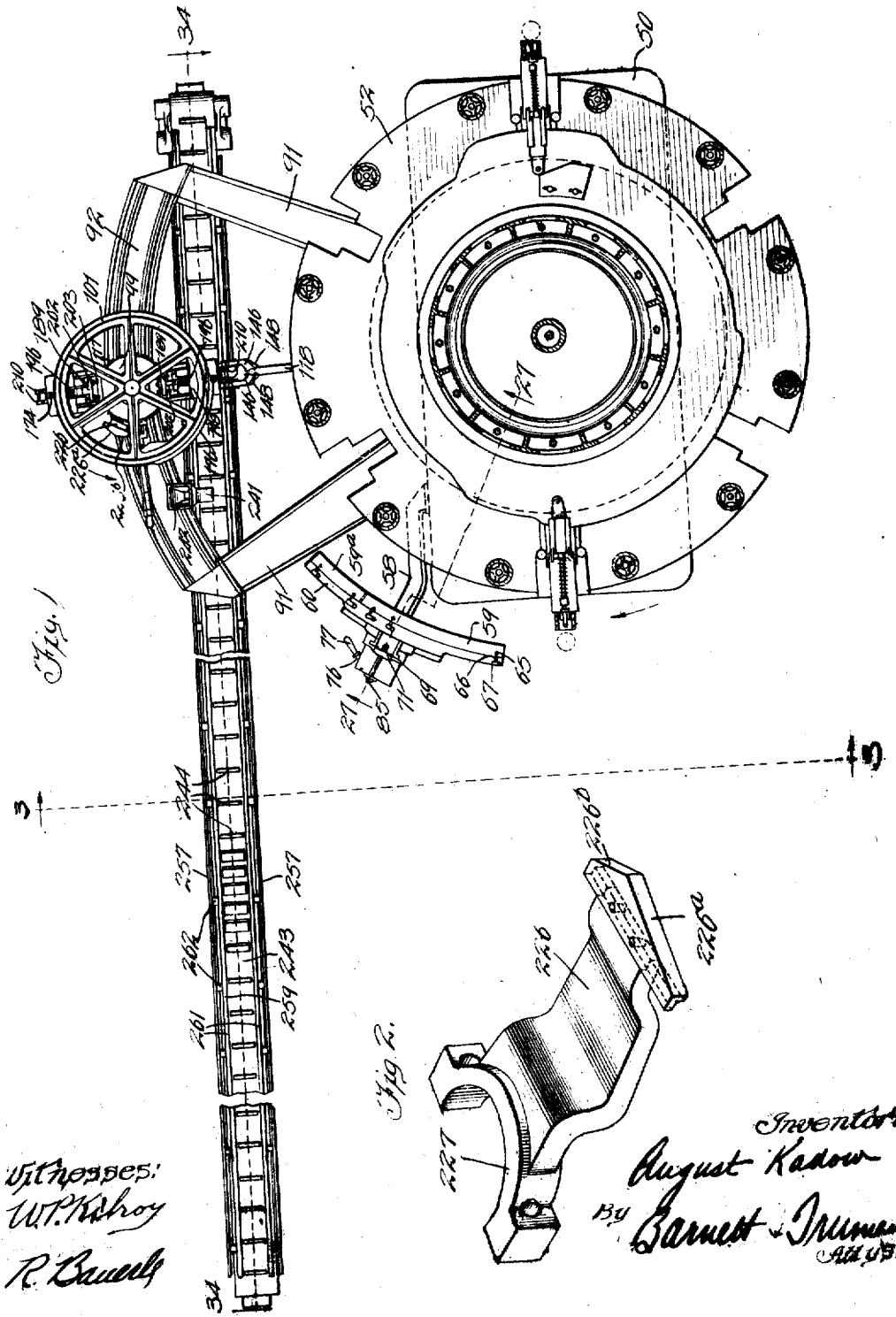
Witnesses:
W. P. Kilroy
R. Bauerle
Inventor.
August Kadow
By Barnett & Truman
Attys.

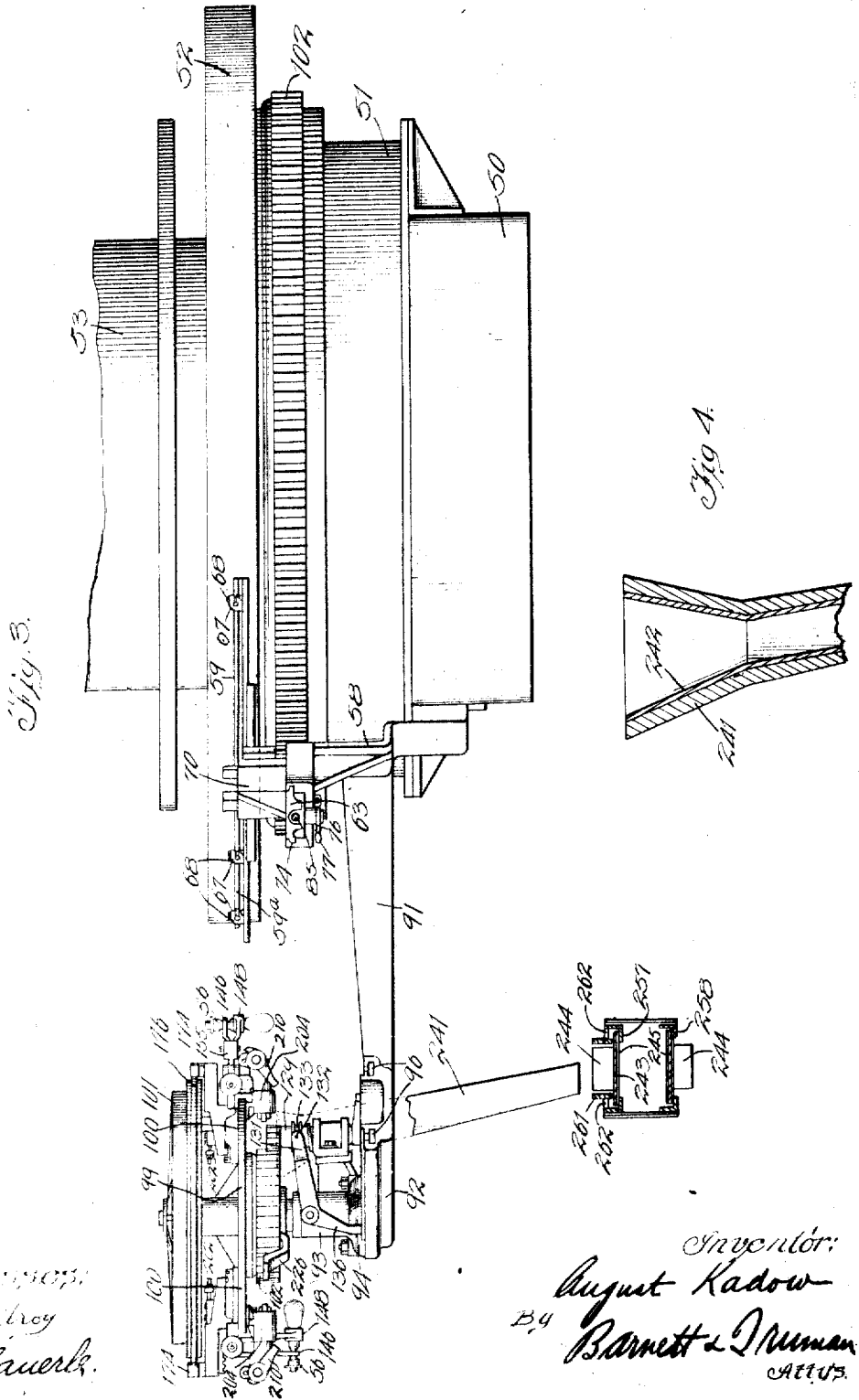

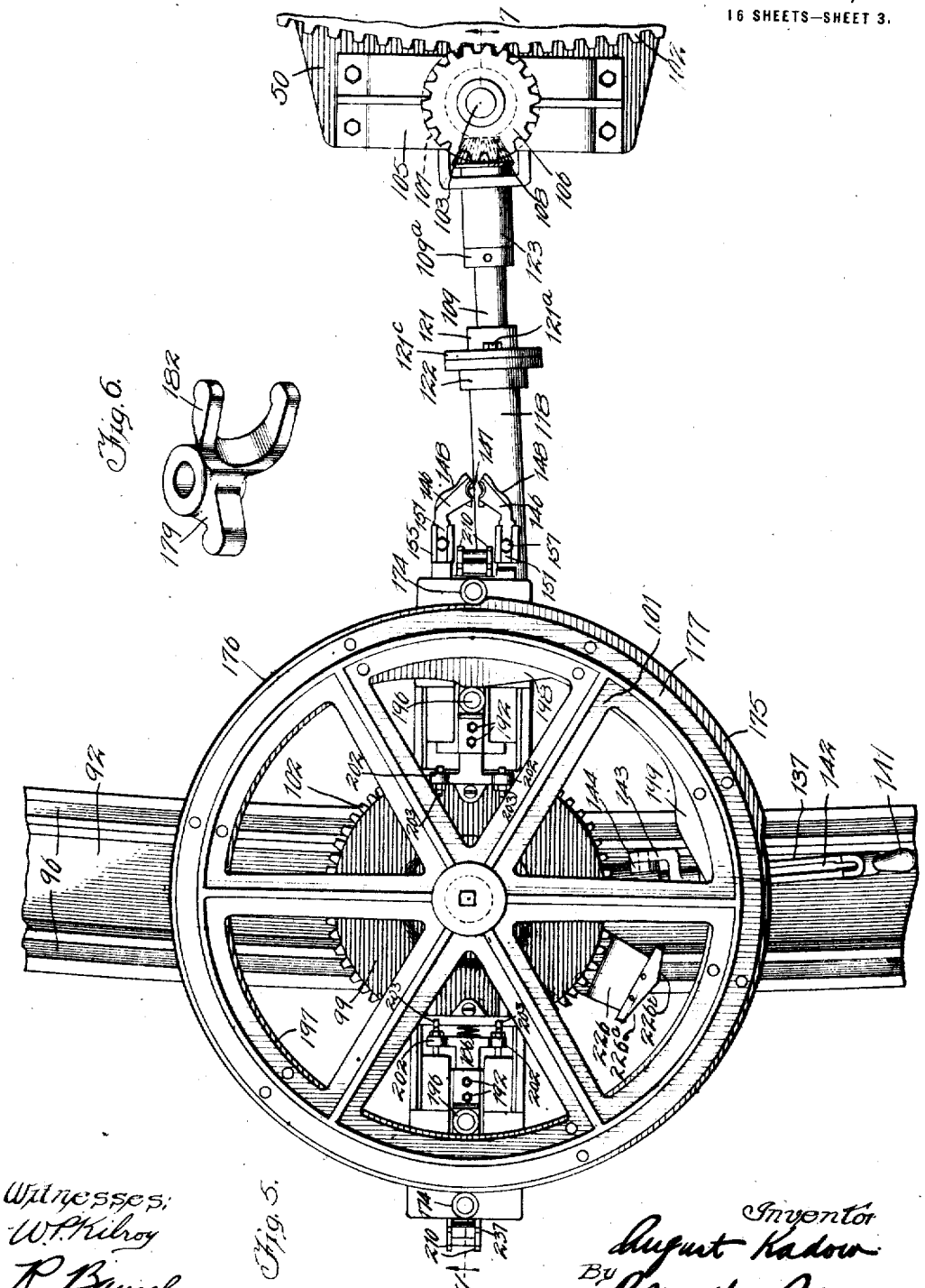

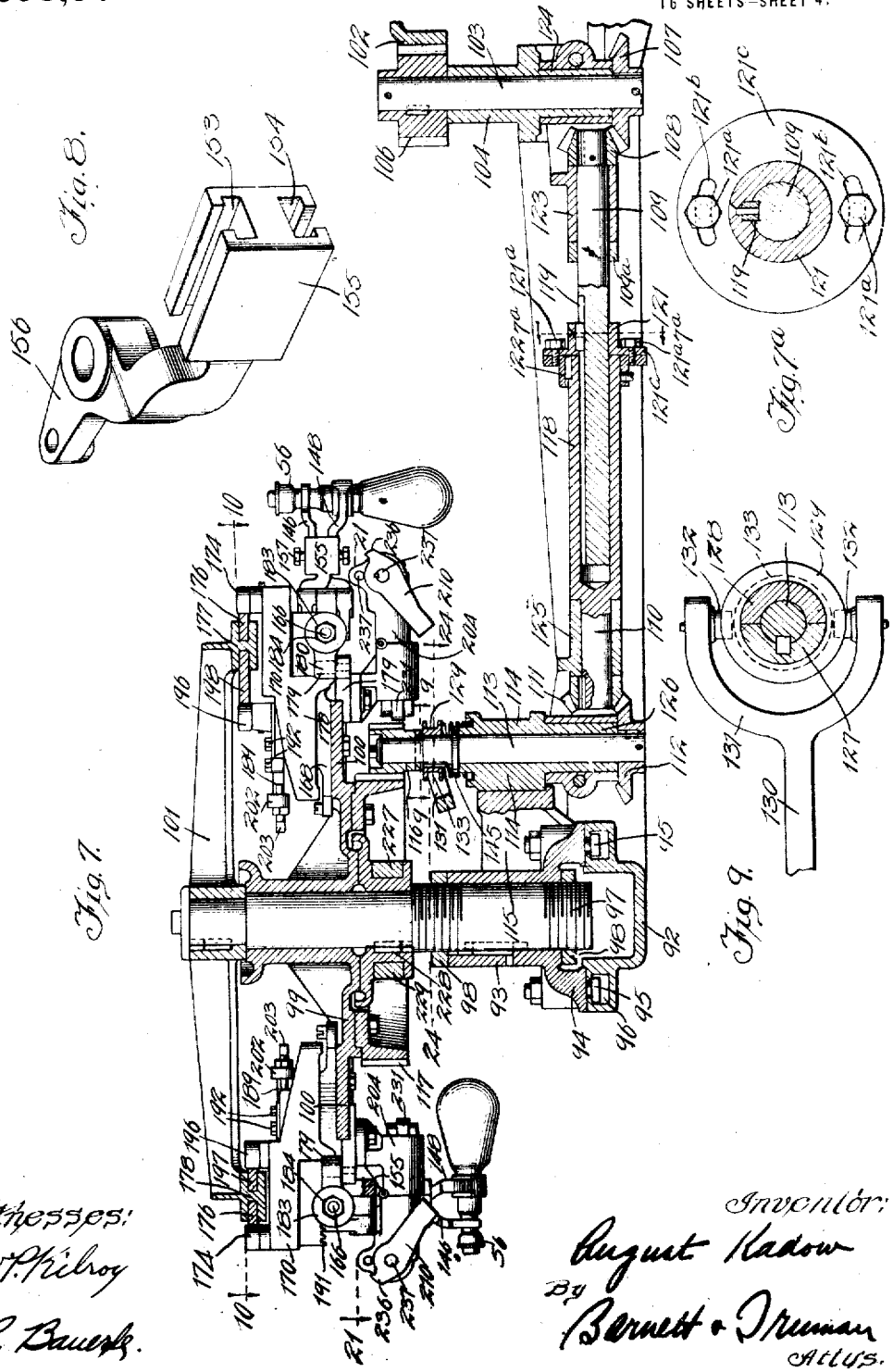

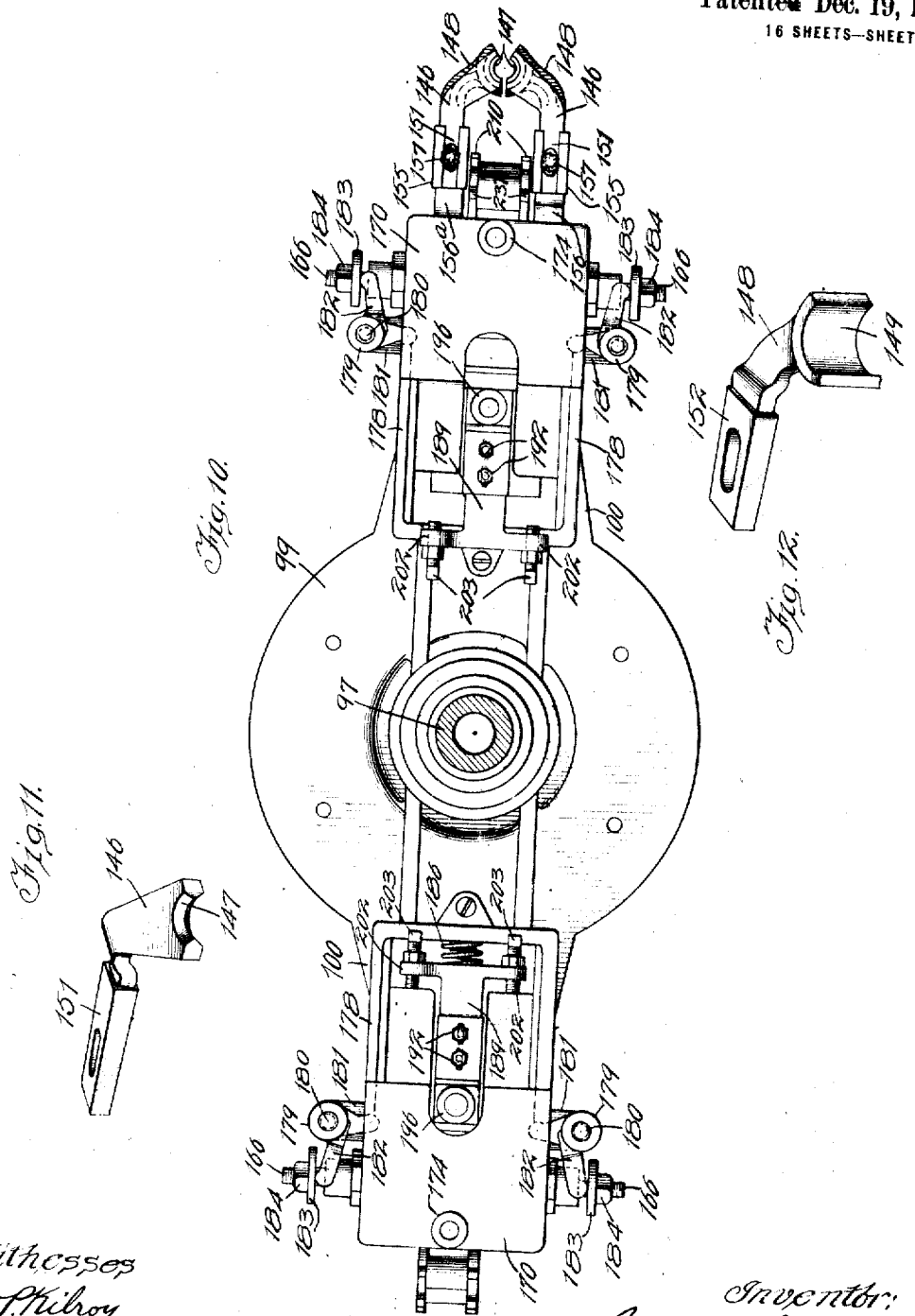

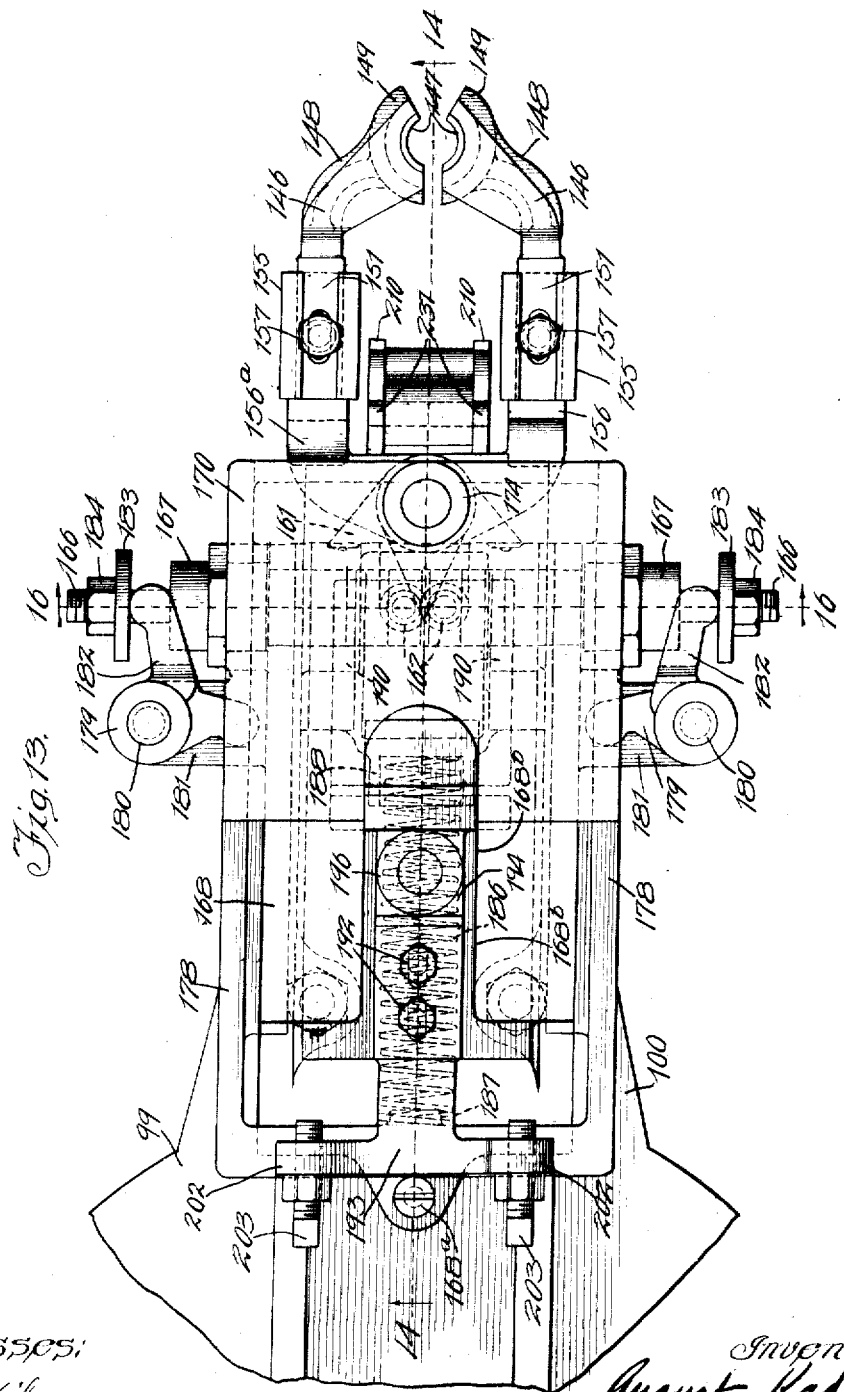

A. KADOW.
GLASS ARTICLE DISCHARGE AND CUT-OFF MECHANISM.
APPLICATION FILED OCT. 21, 1912.
1,208,978.
Patented Dec. 19, 1916.
16 SHEETS—SHEET 7.
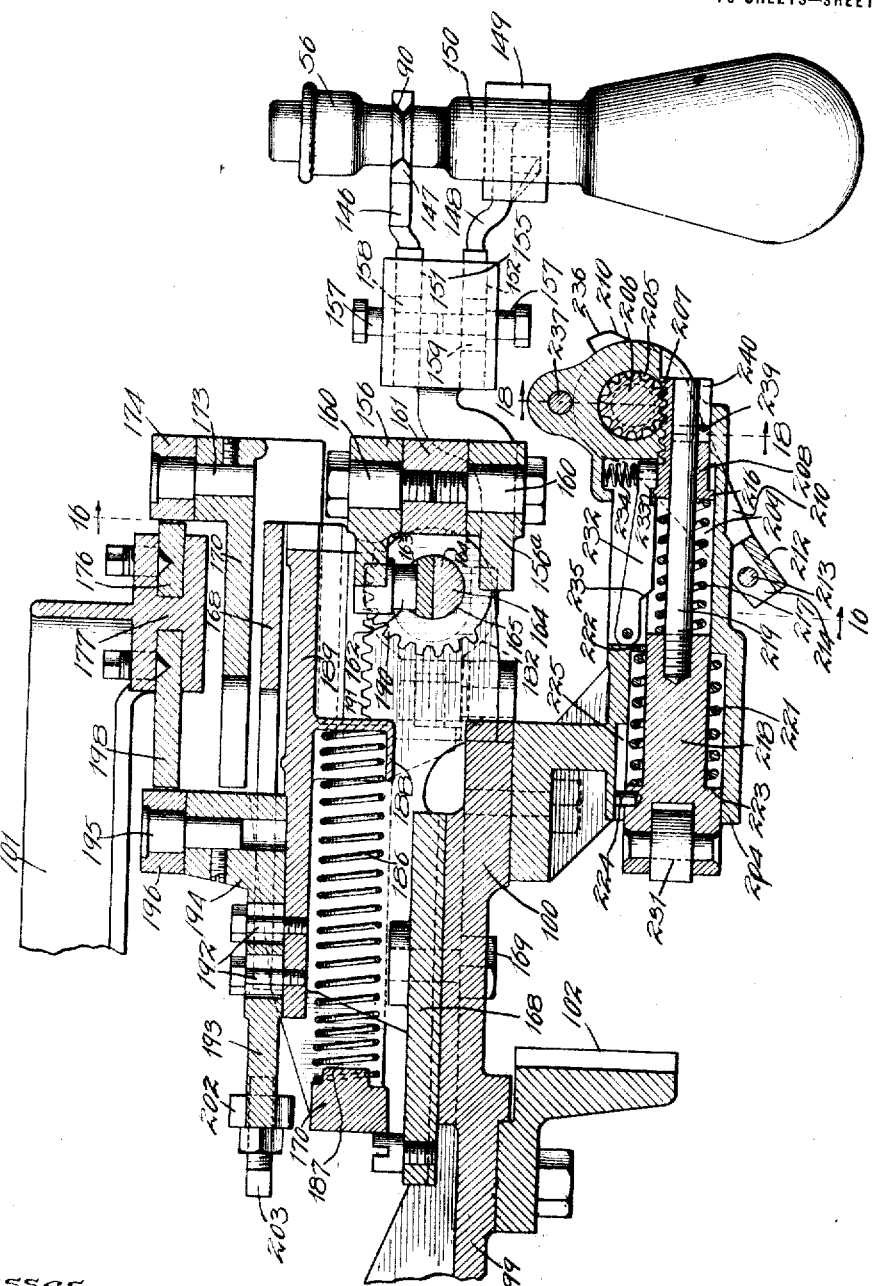
Witnesses,
W. F. Kilroy
R. Bauerle
Inventor:
August Kadow
By
Barnett & Truman
Attys.

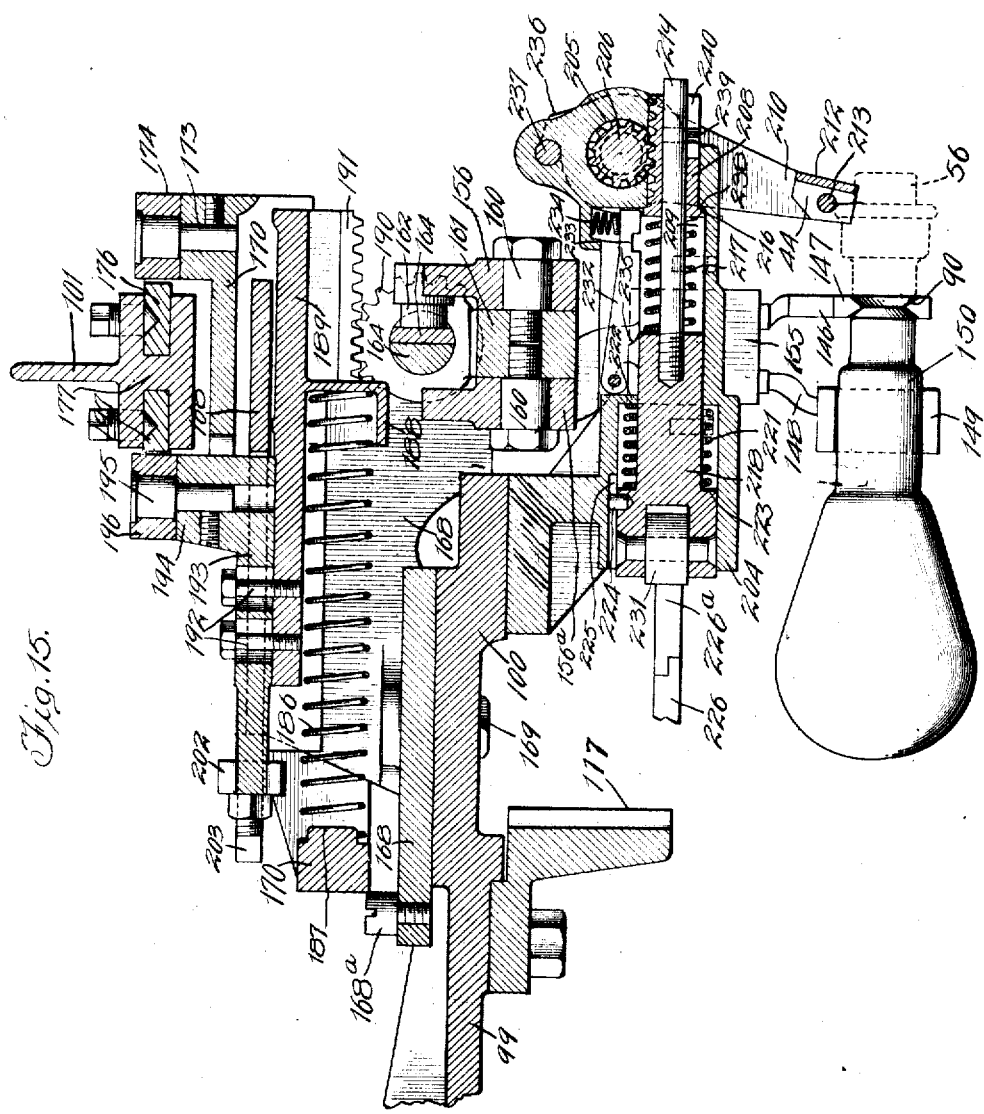

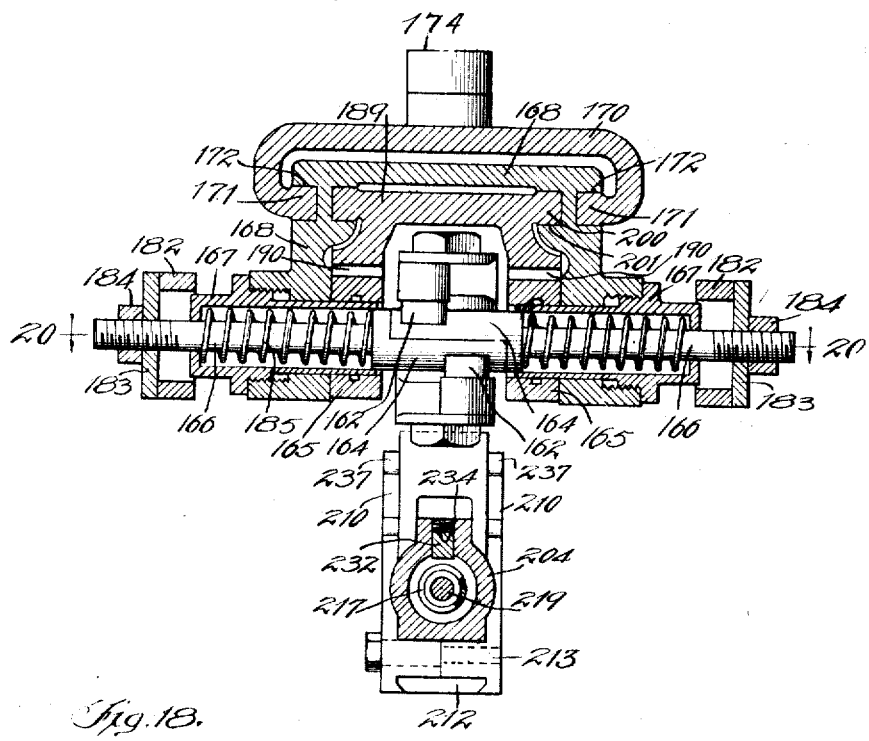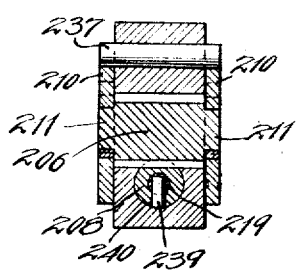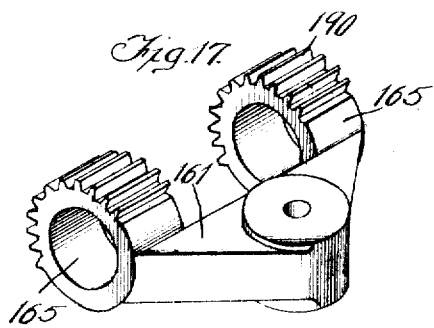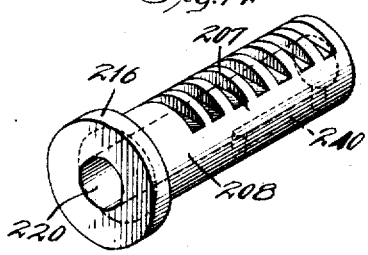

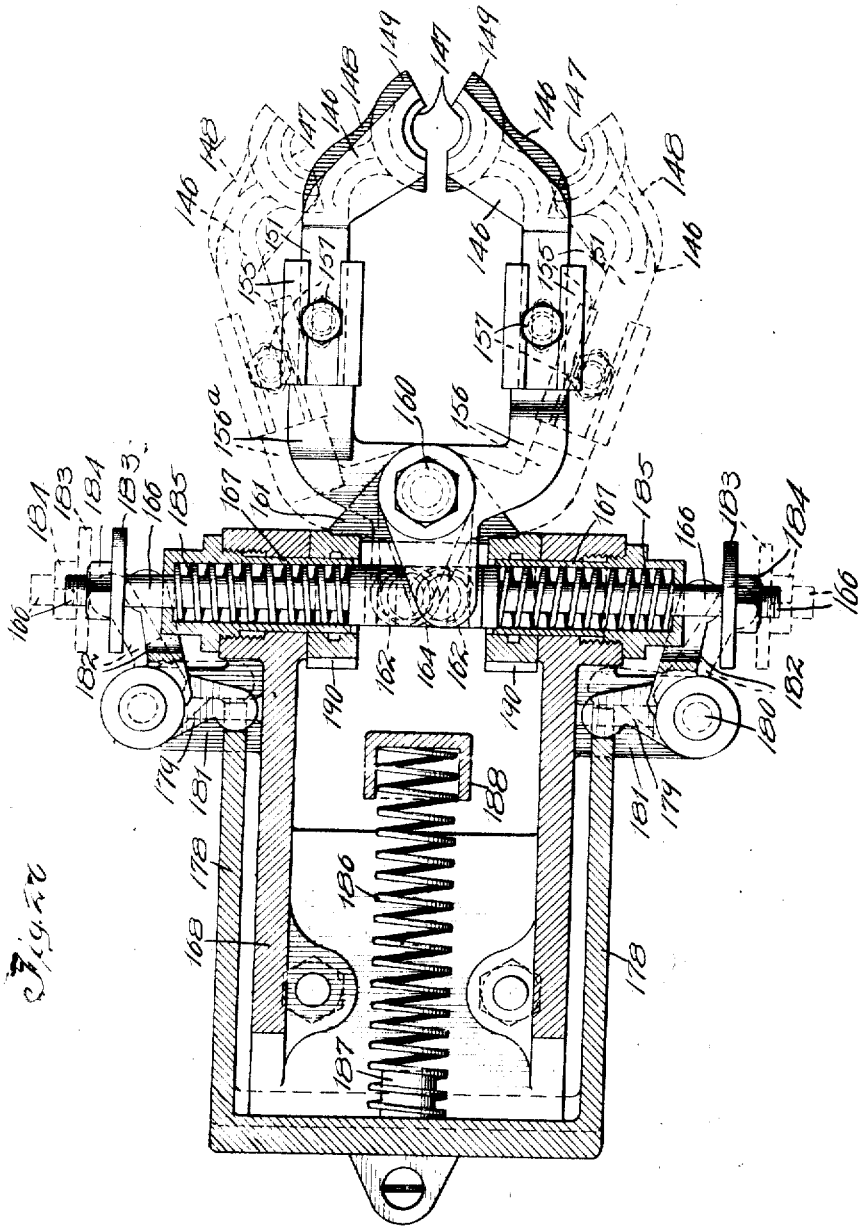

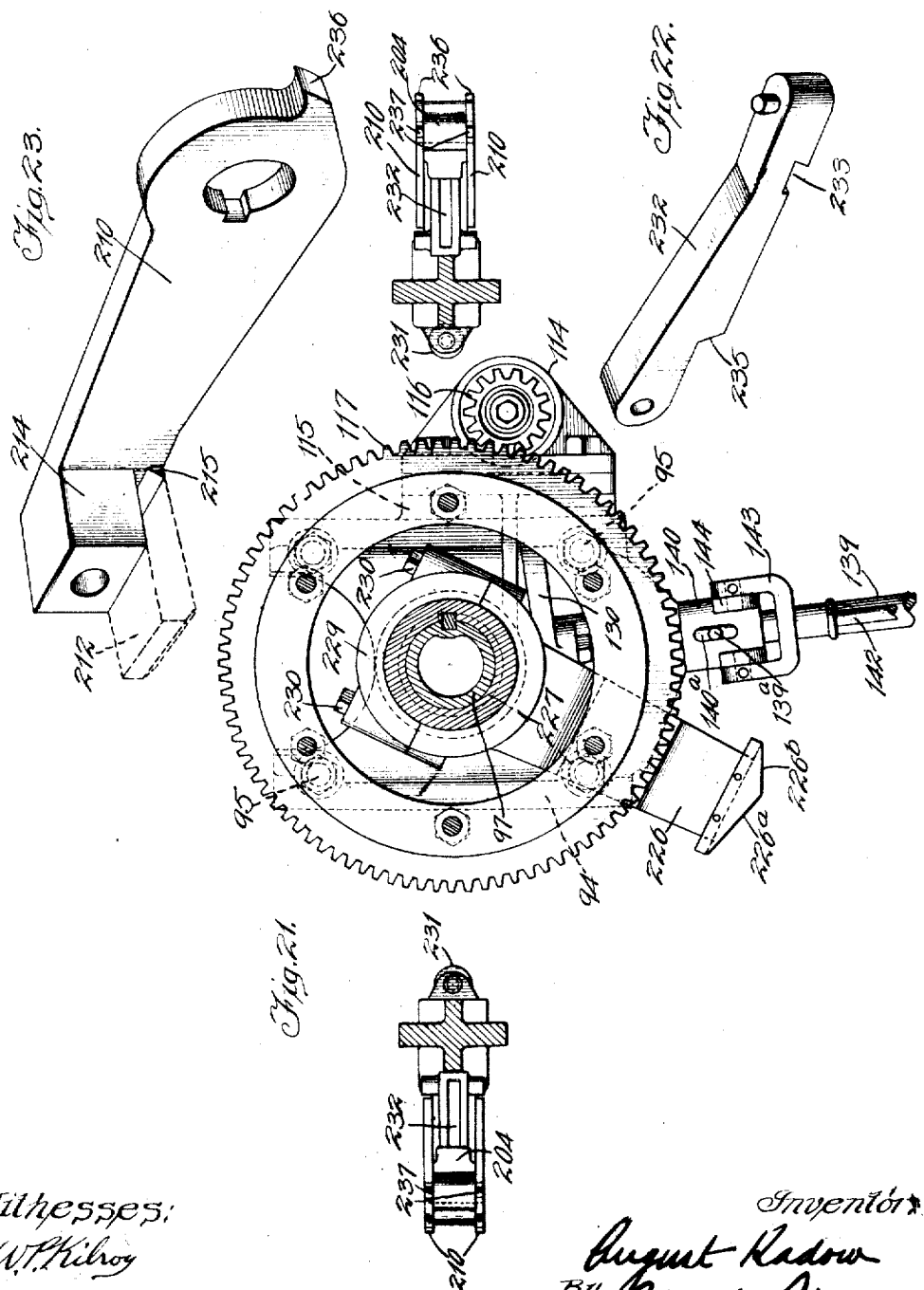

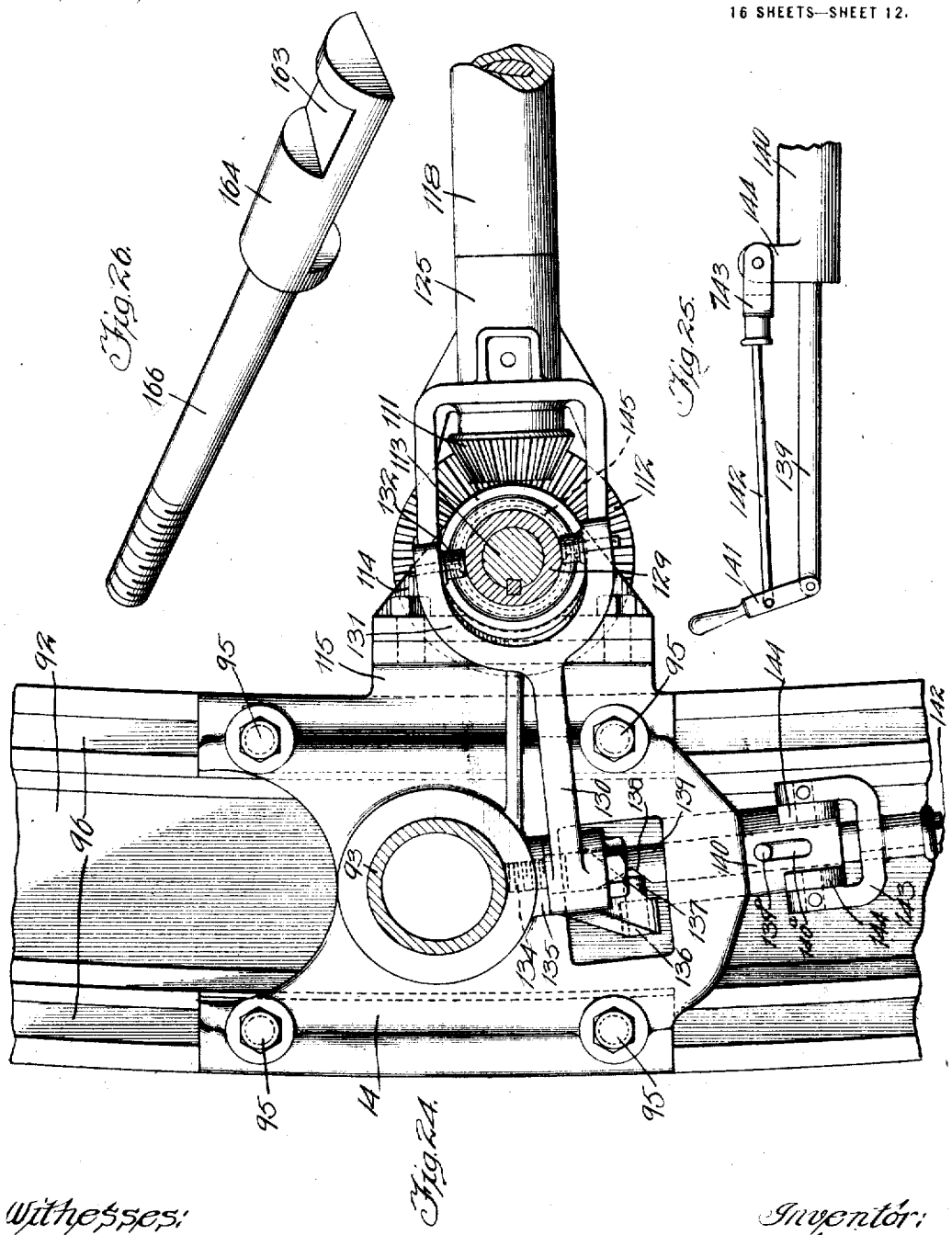

A. KADOW.
GLASS ARTICLE DISCHARGE AND CUT-OFF MECHANISM.
APPLICATION FILED OCT. 21, 1912.

1,208,978.

Patented Dec. 19, 1916.
16 SHEETS—SHEET 13.

Witnesses:
W. P. Kilroy
R. Bauerle

Inventor:
August Kadow
By Barnett & Truman
Attys.

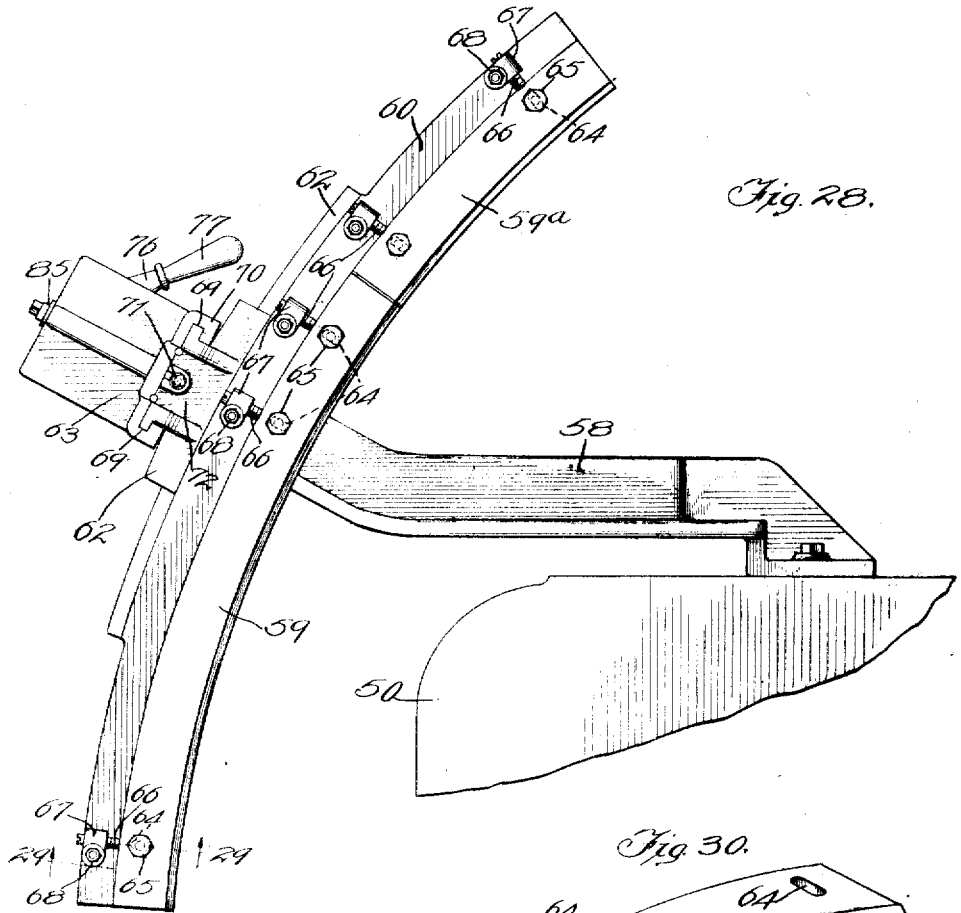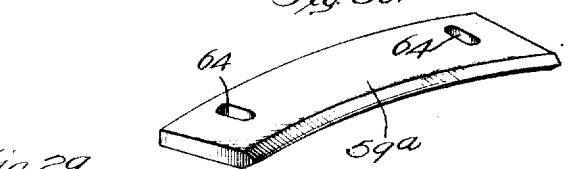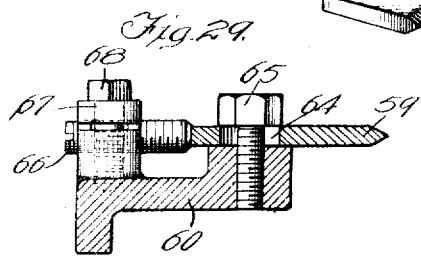

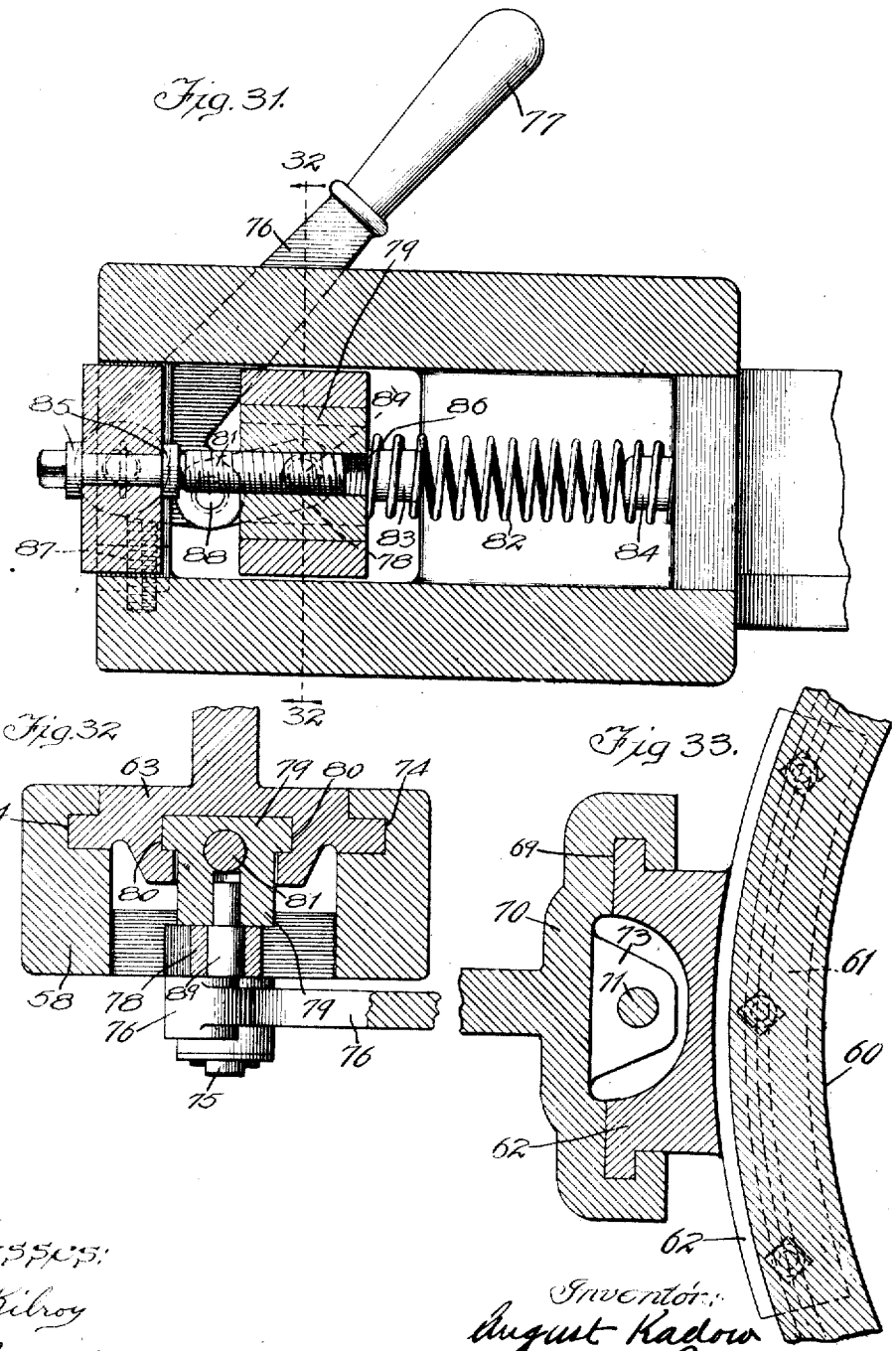

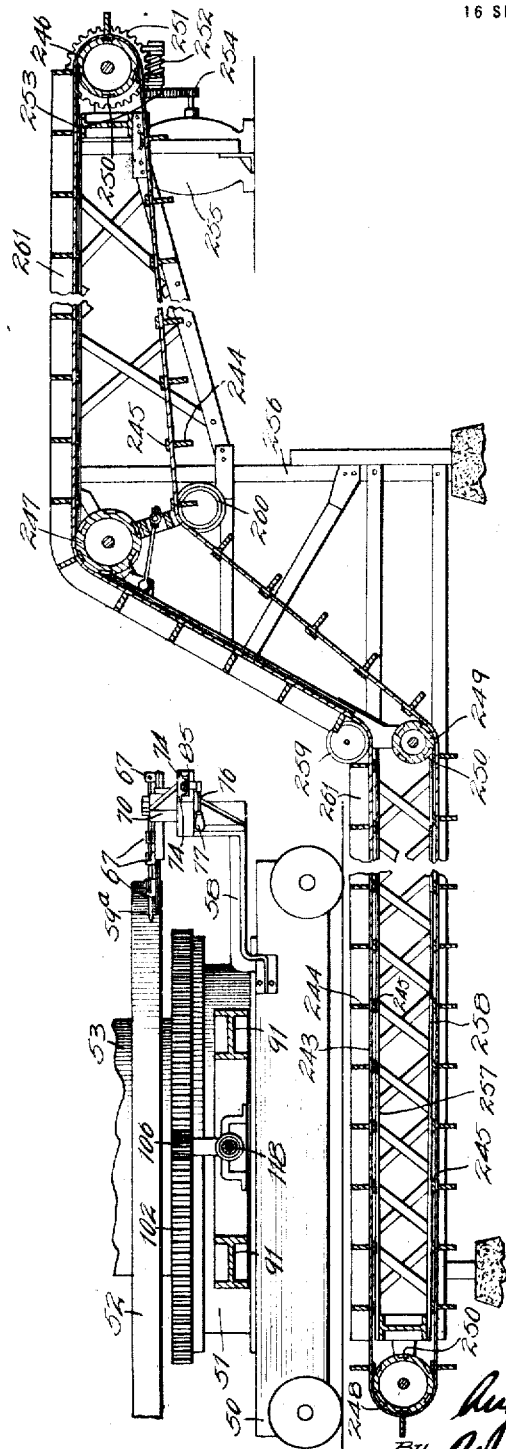

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

GLASS-ARTICLE DISCHARGE AND CUT-OFF MECHANISM.

1,208,978.   Specification of Letters Patent.   Patented Dec. 19, 1916.

Application filed October 21, 1912. Serial No. 726,950.

*To all whom it may concern:*

Be it known that I, AUGUST KADOW, a citizen of the United States, residing at Toledo, in the county of Lucas and State of Ohio, have invented certain new and useful Improvements in Glass-Article Discharge and Cut-Off Mechanism, of which the following is a specification.

My invention relates to machinery for manufacturing glass articles.

One of the objects of the invention is to provide an automatically operating apparatus for removing from a glass forming machine the glass blanks or articles made by said machine, and for transporting the same to some convenient point of deposit.

A further object is to provide apparatus for cutting off or otherwise removing the surplus glass from said blanks or articles.

More specifically, the object of the present invention is to provide apparatus, which will operate automatically in connection with the machine for making electric light bulbs shown in my pending application Serial No. 570,621 filed July 6, 1910, for receiving the bulbs as they are discharged from the spindles and for transporting the same to any desired point for inspection and packing; and, further, to provide means, operating in connection with said receiving or take off device, for removing the surplus glass at the stem or neck of the bulbs, namely, those portions of the blanks which are held by the spindles during the blowing operation and preferably before cooling.

The invention consists in certain novel constructions, arrangements and devices, to be hereinafter described and claimed, for effectively and economically carrying out the purposes above stated.

While the invention will be described in conjunction with the machine of my pending application above referred to, it will be readily understood that the devices which I lay claim to might be used in connection with other machines of similar character.

The invention is illustrated, in a preferred embodiment, in the accompanying drawings, wherein—

Figure 1 is a plan view of the apparatus shown as attached to and operating in connection with the machine of my application Serial No. 570,621, the latter machine being shown in sectional plan. Fig. 2 is a detail view, in perspective, of the cam for operating the hammer which knocks off the surplus metal from the blanks. Fig. 3 is a sectional elevation taken on line 3—3 of Fig. 1, looking in the direction of the arrows. Fig. 4 is a detail vertical section of the chute which receives the blanks from the take-off device. Fig. 5 is a plan view of the take-off device showing the driving connection between this device and the main driving rack or gear of the glass forming machine. Fig. 6 is a detail view, in perspective, of one of the elements of the mechanism employed for operating the jaws which grasp the blanks as they are released by the spindles. Fig. 7 is a vertical sectional view taken on line 7—7 of Fig. 5. Fig. 7ª is a sectional view taken on line 7ª—7ª of Fig. 7. Fig. 8 is a view, in perspective, of one of the jaw holding arms. Fig. 9 is a detail sectional plan on line 9—9 of Fig. 7. Fig. 10 is a sectional plan taken on line 10—10 of Fig. 7, omitting the stationary cams. Figs. 11 and 12 are detail views, in perspective, of one of the upper blank holding jaws and one of the lower of said jaws, respectively. Fig. 13 is a plan view of the jaws and the mechanism for operating the same. Fig. 14 is a sectional view taken on line 14—14 of Fig. 13. Fig. 15 is a similar view in the same plane but showing the parts in different relative positions. Fig. 16 is a vertical sectional view taken on line 16—16 of Fig. 14. Fig. 17 is a detail view, in perspective, of the rocking member on which the jaws are mounted. Fig. 18 is a detail sectional view on line 18—18 of Fig. 4 illustrating a part of the hammer operating mechanism. Fig. 19 is a view, in perspective, of one of the elements of the hammer operating mechanism. Fig. 20 is a sectional plan taken on line 20—20 of Fig. 16. Fig. 21 is a sectional plan taken on line 21—21 of Fig. 7. Fig. 22 is a detail view, in perspective, of the hammer trigger. Fig. 23 is a similar view of one arm of the hammer. Fig. 24 is a sectional plan taken on line 24—24 of Fig. 7 illustrating particularly the construction of the clutch for throwing out the drive of the take off machine and the mechanism for operating said clutch. Fig. 25 is a diagrammatic view illustrating the operating means for the clutch. Fig. 26 is a view, in perspective, of one of the slides for opening and closing the blank holding jaws. Fig. 27 is a sectional view taken on line 27—27 of Fig. 1 showing, however, a blank in position against the cutting or grooving knife. Fig. 28 is a plan view of the parts shown in Fig. 27. Fig. 29 is a sectional view taken on line 29—29 of Fig. 28. Fig. 30 is a detail view, in perspective, of one of the knife sections. Fig. 31 is a sectional plan taken on line 31—31 of Fig. 27. Fig. 32 is a sectional view on line 32—32 of Fig. 31. Fig. 33 is a sectional plan view taken on line 33—33 of Fig. 27, and Fig. 34 is a vertical sectional view taken on line 34—34 of Fig. 1.

Like characters of reference designate like parts in the several figures of the drawings.

The apparatus which forms the subject matter of this application is illustrated and will be described, as stated, in connection with the machine for forming electric light bulbs shown in my pending application Serial No. 570,621. This machine comprises a base 50, a stationary drum on said base, the lower section of which is designated 51, and a framework, a portion of which is shown in the drawings herein and designated 52, which framework rotates around the upper section 53 of the stationary drum. The framework 52 carries a number of glass forming units each of which units is capable of turning out bulbs completely made so far as the operations of this machine are concerned. Each unit comprises, among other instrumentalities which do not concern the present invention, a spindle 54 provided with jaws 55 (Fig. 27) which hold the neck portion 56 of the blank during the operation required for forming the bulb. Each unit comprises also a finishing mold 57, consisting of two mold sections hinged together within which the bulb is rotated, by the axial revolution of the spindle, this operation being the final step in the series of operations performed by the glass forming machine in question. At the conclusion of this finishing operation the mold opens and is moved out of the vicinity of the bulb. Shortly thereafter the jaws 55 of the spindle are opened to discharge the blank.

My present invention provides means for cutting, grooving or otherwise weakening the neck of the bulb between the portion inclosed in the mold and that held by the spindle jaws by an operation which takes place during the rotation of the bulb in the finishing mold.

The invention provides further, a rotary take-off device which is located near the machine and is provided with jaws which grasp the bulb just as it is released by the opening of the spindle jaws. With this take-off device is associated a hammer which, at the proper moment, strikes and knocks off the surplus glass from the bulb, namely, the upper portion of the neck of the bulb beyond the groove or line of weakness produced, as above described, while the blank is in the mold. The jaws on the take-off device are opened at the time the bulb is brought over a receiving chute, the bulb being first tilted to a proper angle to minimize the danger of breakage when it strikes the chute, and the bulb is thereupon discharged into the chute and directed to a conveyer operating to transport the finished bulbs to the proper point in the factory for inspection and shipment.

*The grooving knife.* (See particularly Figs. 1, 3, 27 to 33 inclusive.)—Secured to the base 50 is a bracket 58. The knife, preferably made in two sections, 59, 59ª, is mounted on the bracket so as to be adjustable horizontally and vertically and so that, when occasion demands, it may be quickly thrown out of its operative position. The arrangements for accomplishing these ends are as follows: 60 designates a curved plate secured in a groove 61 formed in the face of a vertically movable slide 62 which latter is mounted on the horizontally movable slide 63 on the bracket 58. The knife sections are formed with slots 64 for the set screws 65. The knife sections back up against set screws 66 threaded through split collars 67 on the plate 60 which are tightened by screws 68. This arrangement gives horizontal adjustability to the knife.

The vertical slide 62 is movably mounted in guideways 69 formed in an upstanding web 70 on the horizontal slide 63. The desired vertical position of the knife may be obtained by the adjusting screw 71 which passes through a lug 72 on the vertical slide and a lug 73 on the web 70. The horizontal slide 63 is movably mounted in guideways 74 provided in the upper end of the bracket 58. Pivotally mounted on a pin 75 on the under side of the bracket is a bell crank lever 76 having a hand grip 77, the short end of the bell crank being connected by means of a link 78 to a block 79 adjustably mounted in guideways 80 in the slide 63 and secured thereto by the adjusting screw 81. A spiral spring 82 is interposed between lugs 83, 84 formed on, respectively, the block 79 and the bracket 58. The adjusting screw 81 which passes loosely through an opening in the slide 63 and is held against movement lengthwise by the collars 85 and enters a threaded opening 86 in the block 79, serves to adjust the tension of the spring 82. A set screw 87 is arranged in the bracket in position to stop the bell crank lever 76, with the centers of pivot pins 88, 89 of the link 78 out of line with the center of bell crank pivot pin 75. With the parts in the relative positions shown in Fig. 31 the knife is disposed in the path of the blank, that is, in the position shown in Fig. 27. By throwing the handle 77 of the bell crank to the left (Figs. 1, 28 and 31) the slide 63 is drawn backward on the bracket so as to move the knife out of its operative position.

With the knife in the operative position the blank is brought against it during the period in which the blank is inclosed in the mold. The mold has a rotary movement as it is secured to the rotary frame 52 of the glass forming machine. The blank is therefore carried along the edge of the knife at the same time it is rotated. This forms the circumferential groove 90 in the blank shown in Figs. 14 and 27. The knife sections 59, 59ª are preferably arranged eccentrically with respect to the axis of the machine, the extremity of knife section 59 adjacent the section 59ª being a trifle closer to the axis of the machine than the other end of this section of the knife. In this way, as the blank travels along the edge of knife section 59 the groove is gradually deepened. Similarly the knife section 59ª may be arranged so that there is a gradual separation of the blank from the knife. The chief function of the knife section 59ª is to keep the groove or cut open until the glass has a chance to congeal. The eccentric arrangement of the knife sections is so slight that no attempt has been made to illustrate it in the drawings.

*The take-off device—general construction.*—The take-off device is preferably connected with the glass forming machine so that it may be adjusted on a curved line concentric with the axis of the machine. It consists of a rotary framework preferably driven from the glass forming machine, which carries one or more take-off units operated by certain stationary cams.

Referring to the drawings, particularly Figs. 1, 3, 6, 7, 24 and 34, 91 designates a bracket which is secured to the lower section 51 of the stationary drum of the machine and is provided with a curved portion 92 concentric with the axis of the machine. The operative parts of the take-off device are mounted on a pedestal 93 having a base 94 secured by means of the bolts 95 to adjusting guideways 96 formed in the curved portion 92 of the bracket. Supported in the pedestal 93 is a shaft 97 held in place by collars 98. Rotatably mounted on the shaft 97 is a circular plate 99 formed with the extension plates 100 on which the mechanisms for removing the blanks from the spindles and for knocking off the stem portions thereof are located. The machine shown in the drawings has two sets of these mechanisms. Fixed to the upper end of the shaft 97 is a spider 101 supporting certain cams for actuating the movements of the take-off mechanism.

*The take-off device—drive and clutch.* (See particularly Figs. 3, 5, 7, 9, 21, 24 and 25.)—The mechanism for driving the take-off device from the glass forming machine—which mechanism, it will be understood, has to be adjustable to accommodate itself to the adjustment of the position of the take-off device with respect to the machine—is preferably made up of the following devices:

The rotating frame 52 of the glass forming machine carries a circular rack or gear 102 by means of which the frame is given its rotary movement. The take-off device, in the embodiment thereof shown in the drawings herein, is driven from the rack 102.

103 designates a countershaft journaled in a bearing 104 in a housing 105 on the base 50 of the glass forming machine. Fixed to the upper end of the countershaft 103 is a gear wheel 106 meshing with the circular rack 102. The other end of the countershaft 103 carries a bevel pinion 107 which is meshed with a bevel pinion 108 on the end of a two-part extensible shaft 109, 110. The other end of the latter shaft carries a bevel pinion 111 meshing with a pinion 112 on a vertical shaft 113 journaled in a bearing member 114 carried by a bracket 115 on the base member 94. On the upper end of the shaft 113 is a gear wheel 116 which meshes with a large gear wheel or circular rack 117 secured to the under side of the plate 99. The outer section 110 of the transmission shaft is provided with a socket 118 which receives the end of the other section 109, the latter being formed with a slot 119 into which projects a key 120 in a collar 121 secured adjustably to a collar 122 on the socket member 118 by means of bolts 121ª which pass through curved slots 121ᵇ in a flange 121ᶜ on the collar 121. This adjustability allows the bevel pinions 108, 111 to be set so that they will properly mesh with the pinions 107, 112, respectively. The section 109 of the transmission shaft is journaled in a bearing member 123 which is loosely mounted on the cylindrical portion 124 of the bearing member 104, the shaft 109 being provided with a collar 109ª pinned thereto and bearing against member 123. Similarly the other section 110 of the transmission shaft is journaled in a bearing member 125, which is loosely mounted on the cylindrically formed portion 126 of the bearing member 114. These arrangements give the adjustability to the driving mechanism made necessary by the adjustability of the position of the take-off machine with respect to the glass forming machine.

Since the spindle jaws are actuated in their opening and closing movements by the rotation of the framework 52, driven by the rack 102 as shown in my said co-pending application, and since the take-off jaws are also actuated from rack 102, these two mechanisms may be synchronized so that when the spindle releases the blank it will be seized in the jaws of the take-off mechanism.

The gear 116 is loosely mounted on the shaft 113 and is clutched thereto by the following mechanism: The lower face of the gear 116 is formed with the semicircular clutching element 127 adapted to engage with a similarly formed element 128 on the clutch member 129, the latter being feathered to and slidable upon the shaft 113. The clutch member 129 is raised and lowered by means of a bell crank 130, one end of which is formed with the yoke 131 provided with pins 132 which extend into a circumferential groove 133 in the clutch member. The bell crank is mounted on a pivot stud 134 fixed in a boss 135 on the pedestal 93. The arm 136 of the bell crank is provided with a pin 137 adapted to be engaged by the cam face 138 (Fig. 24) on a cam rod 139 slidably mounted in a boss 140 on the base member 94. The cam rod is moved back and forth by a hand lever 141 pivoted to the rod 139 and to a rod 142 which carries a yoke 143 pivoted to lugs 144 on the boss 140. The movement of the cam rod 139 is limited by a pin 139ª in the rod which projects into a slot 140ª in the boss 140. The clutch member 129 is normally kept in engagement with the pinion 116 by means of a spring 145 seated on the upper end of the bearing member 114. This spring is compressed when the cam rod 139 is drawn out and the bell crank 130 rocked to move the clutch member out of engagement with the pinion.

*The blank manipulating devices.* (See particularly Figs. 3 to 8, inclusive, 10 to 17, inclusive, 20 and 26.)—The bulbs are grasped and removed from the glass forming machine, this operation taking place exactly at the moments when the spindle jaws open to release the blanks, by means of automatically operating jaws carried by the rotating portion of the take-off device. These jaws comprise a pair of arms 146 (Fig. 11), the forward edges of which are curved and V-shaped in cross section as indicated at 147, these edges being preferably adapted to enter the groove 90 in the blank; and of arms 148 (Fig. 12) having curved portions 149, the interior surfaces of which are smooth so as to engage the cylindrical stem 150 of the blank as is best shown in Figs. 14 and 15. The arms 146, 148 are formed with the straight portions 151, 152 which enter guideways 153, 154 in blocks 155 which form part of the lever arms 156, 156ª, the jaw arm extensions 151, 152 being held in place in the guideways by means of the set screws 157 which pass through slots 158, 159, respectively, in the extensions 151, 152. The lever arms 156, 156ª are pivoted by means of the studs 160 to a revoluble member 161 (Fig. 17). The inner ends of the lever arms 156, 156ª are provided with studs 162 which fit into notches 163 in semicylindrical slides 164 (Fig. 26) which fit into bosses 165 on the rocking member 161 and are provided with stems 166 passing through openings in the ends of sleeves 167 (Fig. 16) secured to and projected into a housing 168 secured by a bolt 169 to the projection 100 formed on the plate 99 (Figs. 14 and 15). Extending over the top of the housing 168 is a slide 170 provided with inturned flanges 171 which extend into guide slots 172 in the sides of the housing. Mounted on a stud 173 on the top of the slide 170 is a roller 174 which, at a certain point in the rotation of the plate 99, meets a cam 175 (Fig. 5) which consists of a projection or widened portion of a ring 176. This cam ring is mounted in a groove formed in the outer ring 177 of the spider 101. The slide 170 is formed with the vertical flanges 178 which abut against rocking members 179 (Figs. 6 and 20) which are pivoted on studs 180 to projections 181 formed on the sides of the housing 168. The rocking members 179 are provided with yokes 182 which bear against washers 183 that in turn bear against nuts 184 on the threaded extremities of the stems 166 of the slides 164. Surrounding the stems 166 are spiral springs 185. A spiral spring 186 is interposed between a lug 187 at the back of the slide 170 (Figs. 14, 15 and 20) and a spring pocket 188 formed on the under side of a slide 189, the latter being normally held against movement in the direction in which the pressure of spring 186 is exerted. The outward movement of the slide 170, which occurs when the roller 174 meets the cam 175, causes the slides 164 to move in opposite directions against the tension of springs 185 which rocks the lever arms 156, 156ª so as to open the jaws. When the roller 174 leaves the cam 175 the jaws close. Preferably the roller is held slightly out of contact with the narrow portion of the ring by a stud 168ª on the housing 168 against which the back of slide 170 abuts.

The blank is received by the jaws of the take-off device in a vertical position (Fig. 14). It is afterward turned into a horizontal position (Fig. 15) in order that the stem portion 56 beyond the notch 90 may be more conveniently knocked off.

The mechanism for swinging the jaws so as to turn the blank from one position to the other is made up of the following parts: The bosses 165 on the revoluble member 161 are formed with teeth 190 which are meshed by racks 191 on the under side of the slide 189 before mentioned. Secured to this slide by the screws 192 is a plate 193 formed with a projection 194 carrying a stud 195 on which is mounted a roller 196 which is adapted to come into contact with cams 198, 199 formed on a cam ring 197 mounted in a groove on the inner circumference of the ring 177 of the spindle 101. When the roller 196 is not in contact with either of the cams 198 or 199 the parts of the mechanism are in the position shown in Fig. 15, that is, with the blank holding jaws horizontal. When the roller meets either of the cams the slide 189 is pushed inwardly against the tension of spring 186. The racks 191 meshing with the teeth 190 formed on the revoluble member 165 give the latter member a quarter revolution which turns the blank to the upright position in which it is shown in Fig. 14. The slide 189 is arranged within the housing 168 the slide being formed with guide ribs 200 which slide in grooves 201 on the inner surfaces of the housing. The inner end of the plate 193 is formed with the projections 202 through which extend the stop screws 203 adapted to bear against the end of the housing 168 (Fig. 13). The screws 203 may be adjusted so as to accurately position the jaws 146, 148 for receiving the bulbs from the glass forming machine.

*The hammer.* (See Figs. 2, 3, 7, 14 to 16 inclusive, 18, 19, 21 to 23 inclusive.)—Secured to the under side of the projection 100 is a housing 204 formed at the outer end with a transversely extending bore 205 in which is arranged a pinion 206 which meshes with teeth 207 formed on a plunger 208 (Fig. 19) mounted in a longitudinal bore 209 in the housing. The hammer consists of two arms 210 (Fig. 23) keyed to the hubs 211 (Fig. 18) of the pinion 206, and a cross piece 212, the latter being clamped by means of the bolt 213 between blocks 214 and lugs 215 on the ends of the arms 210. The plunger 208 is formed with a head 216 against which bears a spring 217 which is compressed by a follower 218 provided with a stem 219 which slides through a bore 220 in the plunger 208. A spring 221 is interposed between a shoulder 222 formed on the inside of the housing and a shoulder 223 on the follower 218. The follower is kept from rotation by means of a pin 224 which slides in a slot 225 in the housing. The follower is moved outwardly to compress the spring 217 and incidentally its own spring 221 by means of a stationary cam 226 (Fig. 2) which is formed with a semicircular flange 227 that fits into a groove in the bearing member 228 (Figs. 7 and 24) supporting the plate 99, the cam being held in place by a semicircular cap 229 secured to the flange 227 by bolts 230. The end of the follower 218 is preferably provided with a roller 231 which is brought into contact with the inclined surface 226ᵃ of the cam by the rotation of the machine. The plunger 208 is held stationary, while the spring 217 is being compressed, by means of a trigger 232 (Fig. 22) pivotally mounted in the housing 204 and formed with a notch 233 which engages the head or rim 216 of the plunger, the trigger being pressed downwardly into engagement with the plunger by a spring 234. The trigger 232 is raised to release the plunger 208 when the forward edge of the follower 218 meets the cam surface 235 on the trigger. As soon as the trigger is raised the spring 217 forces the plunger 208 outwardly rocking the hammer by a quick movement from the position shown in Fig. 14 to that shown in Fig. 15. The hammer strikes the free end or stem 56 of the blank, which has been turned into the horizontal position by the mechanism above described and knocks off this portion of the blank. The arms 210 are provided with stop lugs 236 which come against the ends of a pin 237 in the housing so as to limit the active stroke of the hammer. The forward movement of the plunger 208 is stopped when the rim 216 comes against a shoulder 238 on the inner wall of the housing. The movement inward of the follower 218 is limited by a pin 239 on the stem 219 which works in a slot 240 in the plunger 208. As the roller 231 rides over the angle of cam 226 and down the cam face 226ᵇ the spring 221 returns the follower to its original position compressing spring 217. The inward movement of the follower brings the pin 239 to the inner end of the slot 240 and thereafter moves the plunger 208 inwardly until the rim 216 thereof slips into the notch 233 in the trigger.

*The conveyer.* (See Figs. 1, 3, 4 and 34.)—The jaws 149 are opened to discharge the bulb when the roller 174 meets the cam 175. About this time the roller 196 encounters the cam 199 so that the blank is turned from the horizontal position into a substantially vertical position. The reason for this is to minimize breakage.

The jaws drop the bulbs into a chute such as 241 which is provided preferably with the asbestos lining 242 (Fig. 4). The chute carries the bulbs to a conveyer by means of which they are transported to some suitable place in the factory for inspection and packing. The conveyer preferably consists of a belt 243, of duck or other suitable non-resonant material, to which are secured the cross pieces 244 which serve to hold the bulbs in place on the inclined runs. The cross pieces 244 are fastened to the belt by means of metal strips 245 on the under side of the belt which are nailed to the cross pieces through the belt. The belt runs over drums 246, 247, 248, 249, which are formed with notches 250 into which the metal strips 245 fit. One of these drums, for example the drum 246, is provided with a worm wheel 251 meshed by the worm shaft 252 which carries a gear wheel 253 meshed with a gear wheel 254 on the armature shaft of a motor 255. The drums 246, 247, 248, 249 are supported on a suitable framework 256. The cross pieces 244 do not extend to the extreme edges of the belt 243 which are guided by the angle iron runways 257, 258 and by the idlers 259, 260. On the upper run the cross pieces pass between and close to stationary inclosing strips 261 which are spaced away from the angle irons 257 by the blocks 262. The chute 241 is not essential.

*Operation.*—The blank, supported by the spindle 54, is rotated within the mold 57 as described in my copending application Serial No. 570,621. During this period the portion of the blank between the spindle and the mold is brought into contact with the curved knife 59, 59ᵃ so that a circumferential groove is made in the blank. The mold thereupon opens and is swung out of the way and the blank released from the spindle by the opening of jaws 55. At this moment the jaws on the take-off device receive the blank, the jaw members 147 fitting into the groove 90, the jaw members 149 embracing the stem of the bulb below the groove. The jaws are closed when the roller 174 leaves the cam 175. The resultant inward or backward movement of slide 170 allows the springs 185, 186 to force the slides 164 together which, by rocking the lever arms 156, 156ᵃ, closes the jaws on the blank.

Just before the jaws are closed the roller 196 meets and rides up on the cam 198 and raises the jaws from the position shown in Fig. 15 to that shown in Fig. 14 so that the blank is received in the jaws in vertical position. The roller then leaves the cam and the blank is turned into the horizontal position. The rocking movements of the jaws are effected by the slide 189 actuated by cam 198 (or cam 199, as the case may be) through the engagement of rack 191 with the teeth 190 on the revoluble member 161 on which the jaws are pivoted.

The continued rotation of the machine brings the roller 231 of the follower 218 in contact with the cam 226. The follower 218 is forced outwardly, compressing spring 217 which expands as soon as the follower engages and lifts the trigger 232. The plunger 208 is forced outwardly by quick movement which is transmitted to the hammer through the rack 207 and pinion 206. The hammer comes into contact with the free end or stem portion 56 of the blank and knocks it off. The parts of the hammer mechanism are returned to their initial position when the roller 231 leaves the cam 226. The roller 196, controlling the swinging movement of the jaws, now meets cam 199 so that the blank is turned from the horizontal to the vertical position and when this movement has been effected the roller 174 rides up on cam 175 and opens the jaws, discharging the bulb into the chute 241 by means of which it is conducted to the conveyer.

With the machine of my present invention operating in connection with the glass forming machine of my application Serial No. 570,621, as herein shown and described, the manufacture of a completely formed bulb is performed in a single operation or continuous series of operations. This is important because it is highly desirable that the removal of the superfluous glass at the stem of the bulb should be accomplished without allowing the bulb to cool. It has been found, after considerable experience, that if the extremity of the stem is cut off after the bulb is cooled it is necessary to anneal the bulb in order to put it into condition for the subsequent operations which have to be performed upon it. The portion of glass cut off is relatively thick and heavy and apparently when the bulb, the usable portion of which is very thin, cools with this thick, heavy body of glass attached to it, certain strains result which affect the character or consistency of the bulb so that when reheated it is likely to break unless, after the stem portion has been removed, the bulb is annealed. By removing the surplus glass from the bulbs before they cool the necessity for annealing is entirely done away with.

The operation of removing the surplus glass is also facilitated by working upon the bulbs while they are hot. By the time the bulbs have reached the finishing molds the glass is in a relatively solidified state but is still soft enough so that it can be cut or indented by bringing the bulbs into contact with the knife in the manner described. The bulbs are further cooled by the time they are brought under the hammer but they are still not quite completely congealed. It is therefore necessary that the hammer should produce a sharp, quick blow. A blow of this sort knocks off the projecting end of the stem giving a clean cut.

While I prefer, for reasons of economy and for other reasons, to produce the weakness along the lines of parting by means of a knife, as shown and described, it is feasible to use an emery wheel or a gas flame. While I deem the arrangement of the knife shown in the drawings to be preferable it is possible to provide the finishing molds with knives instead of having a single knife against which the blanks are brought into contact successively.

I claim:

1. In glass manufacturing apparatus, the combination with a blank holding device, of a device for weakening the blank at a line of intended parting, and means for giving the blank holding device movement of translation past said last named device with the blank in operative contact therewith.

2. In glass manufacturing apparatus, the combination with a revoluble blank holding device, of a device for weakening the blank at a line of intended parting, and means for simultaneously giving the blank holding device movement of rotation and of translation past said last named device with the blank in operative contact therewith.

3. In glass manufacturing apparatus, the combination with a knife in fixed position, of a blank holding device and means for giving the blank holding device movement of translation past said knife with the blank in operative contact therewith.

4. In glass manufacturing apparatus, the combination with a knife in fixed position, of a blank holding device, means for giving the blank holding device movement of translation past said knife with the blank in operative contact therewith, and means for shifting the knife out of the path of the blanks.

5. In glass manufacturing apparatus, the combination with a knife in fixed position, of a revoluble blank holding device, and means for giving the blank holding device movement of translation past the knife with the blank in contact therewith.

6. In glass manufacturing apparatus, the combination with a rotary frame, of an axially revoluble spindle carried thereby provided with blank holding means, a mold adapted to inclose the blank, and means arranged in the path of the blank for weakening the blank between the mold and the spindle.

7. In glass manufacturing apparatus, the combination with a rotary frame, of an axially revoluble spindle carried thereby provided with blank holding means, a mold adapted to inclose the blank, and a curved knife with which the portion of the blank between the mold and spindle is brought into contact while the blank is being rotated in the mold.

8. In glass manufacturing apparatus, the combination with a rotary frame, of an axially revoluble spindle carried thereby provided with blank holding means, a mold adapted to inclose the blank, a curved knife with which the portion of the blank between the mold and spindle is brought into contact while the blank is being rotated in the mold, and means for moving said knife out of operative position.

9. In glass manufacturing apparatus, the combination with blank supporting means, of a horizontally arranged knife against which the blank is brought to bear, and a vertically adjustable slide to which said knife is secured.

10. In glass manufacturing apparatus, the combination with blank supporting means, of a knife against which the blank is brought to bear, a carrier on which said knife is mounted, a frame on which said carrier is sustained, a bell crank pivoted to the frame, a link pivotally connecting the bell crank and carrier, a stop for the bell crank, and a spring which bears against the carrier.

11. In glass manufacturing apparatus, the combination with a rotary frame, of an axially revoluble spindle, a stationary support, a knife carrier, a vertically adjustable slide on said carrier, a knife secured to said slide, and mechanism for moving said carrier so as to bring the knife into and out of operative position and for locking the same in said operative position.

12. The combination with a rotatable glass forming machine, of a rotatable device for removing the blanks from said glass forming machine, the position of which is adjustable circumferentially with respect to the axis of the glass forming machine.

13. The combination with a rotatable glass forming machine, of a rotatable device for removing the blanks from said glass forming machine, the position of which is adjustable circumferentially with respect to the axis of the glass forming machine, and means for driving said device from said machine.

14. The combination with a rotatable glass forming machine, of a rotatable device for removing the blanks from said glass forming machine, each provided with a circular rack, and a driving connection between said racks comprising a shaft composed of two sections which are adjustably engaged so that the length of the shaft may be varied.

15. The combination with a rotatable glass forming machine, of a rotatable device for removing the blanks from said glass forming machine, each provided with a circular rack, and a driving connection between said racks comprising a pair of countershafts having pinions meshing with said racks respectively, and with bevel gears, a transmission shaft having bevel gears which mesh with the bevel gears on the countershafts, which shaft is composed of two sections adjustably engaged so that the length of the shaft may be varied, and bearings for said countershaft sections which are revolubly mounted around the countershafts.

16. The combination with a glass forming machine comprising a base and a revoluble frame supporting the glass forming mechanisms, of a bracket on said base provided with guideways concentric with the axis of said machine, and a device for removing the blanks from said machine which is adjustably mounted in said guideways.

17. The combination with a glass forming machine comprising a base and a revoluble frame supporting the glass forming mechanisms, of a bracket on said base provided with guideways concentric with the axis of said machine, and a revoluble device for removing the blanks from said machine which is adjustably mounted in said guideways.

18. The combination with a glass forming machine comprising a base and a revoluble frame supporting the glass forming mechanisms, of a bracket on said base provided with guideways concentric with the axis of said machine, a revoluble device for removing the blanks from said machine which is adjustably mounted in said guideways, and means for driving said device from said machine.

19. In apparatus for removing blanks from a glass forming machine, the combination with a movable frame, of a pair of jaws pivotally mounted on the frame, a stationary cam, and mechanism actuated by the cam for opening and closing said jaws.

20. In apparatus for removing blanks from a glass forming machine, the combination with a movable frame, of a pair of jaws pivotally mounted on said frame, slides with which said jaws are engaged, and mechanism for moving said slides in opposite directions so as to open and close the jaws.

21. In apparatus for removing blanks from a glass forming machine, the combination with a movable frame, of a pair of jaws pivotally mounted on said frame, slides with which the jaws are engaged, a stationary cam, and a slide which is actuated by said cam for moving said first named slides in opposite directions so as to open and close said jaws.

22. The combination with a glass forming machine comprising blank holding means and means for forming a circumferential groove in the blank, of means for removing the blank from said machine comprising jaws provided with members which enter said grooves in the blanks, and an impact element which strikes one end of said blank.

23. The combination with a glass forming machine comprising blank holding means and means for forming a circumferential groove in the blank, of means for removing the blanks from said machine comprising jaws provided with members which enter said grooves in the blanks, means for turning the blanks at an angle to the position they assumed when received by the jaws, and an impact element which strikes one end of the blank.

24. The combination with a glass forming machine comprising blank holding means and means for forming a circumferential groove in the blank, of means for removing the blank from said machine comprising jaws provided with members which enter said groove in the blank, and members which grasp the blank at one side of said groove, and an impact element which strikes the blank at the other side of said groove.

25. The combination with a glass forming machine comprising blank holding means and means for forming a circumferential groove in the blank, of means for removing the blank from said machine comprising jaws provided with members which enter said groove in the blank, and members which grasp the blank at one side of said groove, means for turning the blank at an angle to the position it assumed when received by the jaws, and an impact element adapted to knock off the free end of the blank.

26. The combination with a glass forming machine, of means for weakening the blanks along intended lines of parting, a take-off device which receives the blanks from the glass forming machine, and an impact element adapted to strike against one end of the blank.

27. The combination with a glass forming machine, of means for forming a circumferential groove in the blank, a take-off device which receives the blank from the glass forming machine, and an impact element adapted to strike against one end of the blank.

28. The combination with a glass forming machine, of means for forming a circumferential groove in the blank, a take-off device comprising jaws having members adapted to enter said groove and members adapted to grasp the blank at one side of said groove, and an impact element adapted to strike the free end of the blank.

29. The combination with a glass forming machine, of means for forming a circumferential groove in the blank, a take-off device comprising jaws having members adapted to enter said groove and members adapted to grasp the blank at one side of said groove, means for swinging the jaws so as to turn the blank into a position at an angle to that assumed by it when received by the jaws, and an impact element adapted to strike against the free end of the blank.

30. The combination with a rotary glass forming machine comprising blank holding means adapted to release the blank when finished, of a rotary take-off device provided with jaws adapted to grasp the blank when released by the blank holding means of said machine, and an impact element adapted to strike against one end of said blank.

31. The combination with a rotary glass forming machine provided with blank holding means adapted to release the blank when finished and with means for weakening the blanks along intended lines of parting, of a rotary take-off device provided with jaws adapted to grasp the blank when released by the blank holding means of said machine, and an impact element adapted to strike against the blank at one end.

32. The combination with a rotary glass forming machine provided with blank holding means adapted to release the blank when finished, of a knife in contact with which the blank is moved so as to form a circumferential groove, a rotary take-off device provided with jaws adapted to grasp the blank when released by the blank holding means of said machine, and an impact element adapted to strike against the end of said blank.

33. The combination with a rotary glass forming machine provided with blank holding means adapted to release the blank when finished, of a knife in contact with which the blank is moved so as to form a circumferential groove, a rotary take-off device provided with jaws comprising arms adapted to enter said groove and jaws which engage the blank at one side of said groove, and an impact element adapted to knock off the free end of said blank.

34. In apparatus for removing blanks from a glass forming machine, the combination with jaws, of slides with which said jaws are connected, a revoluble member through which the slides move and upon which the jaws are pivoted, means for moving the slides to open and close the jaws, and means for giving a partial revolution to said revoluble member so as to turn the blanks to different angular positions.

35. In apparatus for removing blanks from a glass forming machine, the combination with jaws, of slides with which said jaws are connected, a revoluble member through which the slides move and upon which the jaws are pivoted, means for moving the slides to open and close the jaws, means for giving a partial revolution to said revoluble member so as to turn the blanks to different angular positions, and means for removing the glass from the blanks at one end.

36. In apparatus for removing blanks from a glass forming machine, the combination with jaws, of slides with which said jaws are connected, a revoluble member through which the slides move and upon which the jaws are pivoted, means for moving the slides to open and close the jaws, means for giving a partial revolution to said revoluble member so as to turn the blanks to different angular positions, and an impact element adapted to strike against the blanks at one end.

37. In apparatus for removing blanks from a glass forming machine, the combination with jaws, slides with which said jaws are connected, a revoluble member through which said slides move and upon which the jaws are pivoted, means for giving a partial revolution to said revoluble member, a cam operated slide, and rocking devices interposed between said last mentioned slides and the first mentioned slides.

38. In apparatus for removing blanks from a glass forming machine, the combination with jaws, of slides with which said jaws are connected, a revoluble member through which said slides move and upon which the jaws are pivoted, means for moving said slides in opposite directions to open and close the jaws, said revoluble member being formed with teeth, and a slide provided with a rack engaging said teeth.

39. In apparatus for removing the blanks from a glass forming machine, the combination with jaws, of slides with which said jaws are connected, a revoluble member through which the slides move and upon which the jaws are pivoted, a cam operated slide, rocking devices interposed between said last mentioned slides and the first mentioned slides, teeth formed on said revoluble member, and another cam operated slide provided with a rack which meshes with said teeth.

40. In apparatus for removing blanks from a rotary glass forming machine, the combination with a rotary framework provided with a housing, jaws for grasping the blanks, a revoluble member to which said jaws are pivoted, slides extending through said revoluble member provided with stems, springs bearing against said slides, a slide on said housing, a stationary cam by means of which said last named slide is moved, rocking devices interposed between said last named slide and the stems of the first named slides, teeth on said revoluble member, a slide within said housing provided with a rack meshing with said teeth, and a stationary cam from which the movements of said last mentioned slide are actuated.

41. In apparatus of the character described, the combination with means for holding a blank, of an impact element, and means for operating the same so as to strike off a portion of the blank.

42. In apparatus of the character described, the combination with means for holding a blank, of an impact element, a spring, means for compressing the spring, and means for releasing the spring so that it acts upon the impact element and forces it against the blank.

43. In apparatus of the character described, the combination with means for holding a blank, of an impact element, an actuating member to move the same, a spring which bears against the actuating member, retaining means for said actuating member, and mechanism for compressing the spring and then releasing said actuating member.

44. In apparatus of the character described, the combination with means for holding a blank, of a pivoted impact element, a gear wheel thereon, a plunger formed with a rack, a spring bearing against said plunger, a trigger which retains the plunger against the pressure of the spring, and a follower which compresses said spring and moves the trigger so as to release said plunger.

45. In apparatus of the character described, the combination with means for holding a blank, of a pivoted impact element, a gear wheel thereon, a plunger formed with a rack, a spring bearing against said plunger, a trigger which retains the plunger against the pressure of the spring, a follower which compresses said spring and moves the trigger so as to release said plunger, and a cam by which the movements of the follower are actuated.

46. In apparatus of the character described, the combination with a rotatable frame, of blank holding means thereon, an impact element provided with an operating spring, and means actuated by the movement of said rotating frame for compressing said spring and releasing the same so as to give said impact element its active stroke.

47. In apparatus of the character described, the combination with a rotatable frame, of blank holding means thereon, a housing carried by said frame, an impact element rotatably mounted in said housing and provided with a gear wheel, a plunger in said housing having a rack meshing with said gear wheel, a spring bearing against the plunger, a trigger to hold the plunger against the pressure of the spring, a follower adapted to compress said spring, a stationary cam for actuating the movements of the follower, said plunger being formed with a bore, and a stem on said follower extending into said bore and provided with means for engaging said plunger on the back stroke.

48. In glass manufacturing apparatus, the combination with a revoluble glass forming machine provided with blank holding jaws which open to release the blank, of a revoluble take-off device provided with jaws adapted to close upon the blank as it is released by the jaws on the glass forming machine, and means for removing the portion of the blank held by the jaws of the glass forming machine.

49. In glass manufacturing apparatus, the combination with a revoluble glass forming machine provided with blank holding jaws which open to release the blank, of means for weakening the blank along an intended line of parting, a revoluble take-off device provided with jaws adapted to close upon the blank when released by the jaws on the glass forming machine, and means for removing from the blank the portion thereof at one side of said weakened line.

50. In glass manufacturing apparatus, the combination with a revoluble glass forming machine provided with blank holding jaws which open to release the blank, of means for weakening the blank along an intended line of parting, a revoluble take-off device provided with jaws adapted to close upon the blank when released by the jaws on the glass forming machine, an impact element, and means for bringing the blank and impact element together so as to remove from the blank the portion thereof at one side of said weakened line.

51. The combination with a revoluble glass forming machine, of a take-off device adjustable radially of the axis of said machine, a pinion fixed with respect to said axis, a gear concentric with said axis meshing with the pinion, and means for driving the take-off device from said pinion in any of its adjusted positions.

AUGUST KADOW.

Witnessed by—
G. M. RESWICK,
W. L. VAN NESS.